INVENTORS:
FREDERICK K. MESEK
ROBERT C. SHEPHERD
BY Nicholas A. Gallo, III
ATTORNEY.

Dec. 9, 1969   F. K. MESEK ET AL   3,483,051
METHOD OF MAKING A NONWOVEN FABRIC
Filed Sept. 13, 1966   2 Sheets-Sheet 2
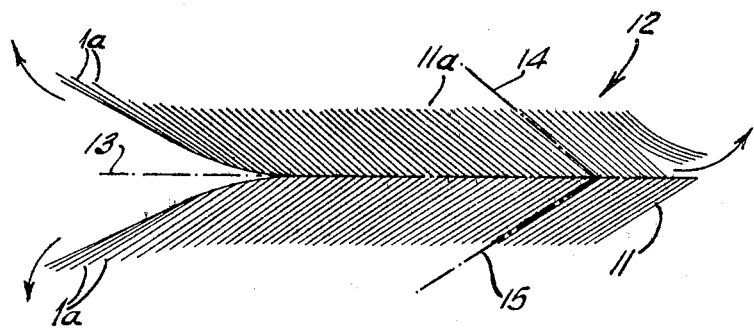
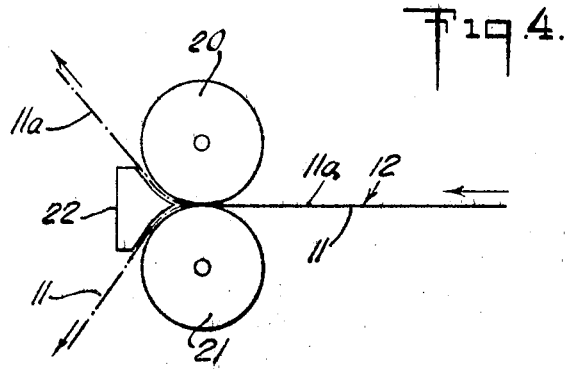
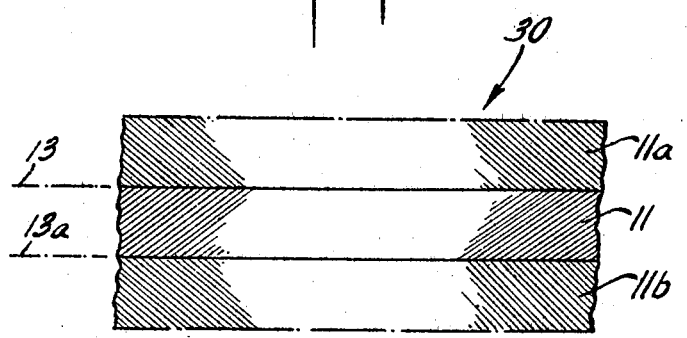
INVENTORS:
FREDERICK K. MESEK
ROBERT C. SHEPHERD
BY
Nicholas A. Gallo, III
ATTORNEY.

3,483,051
METHOD OF MAKING A NONWOVEN FABRIC
Frederick K. Mesek, Downers Grove, and Robert C.
Shepherd, Oak Lawn, Ill., assignors to Johnson &
Johnson, a corporation of New Jersey
Filed Sept. 13, 1966, Ser. No. 579,023
Int. Cl. B32b 19/00, 31/00
U.S. Cl. 156—62.2        7 Claims

ABSTRACT OF THE DISCLOSURE

A plurality of nonwoven fabrics are made by continuously forming a composite web having an interface with converging planes of oppositely oriented individual fibers on adjacent sides of the interface. The fibers are bonded together and then the continuously moving composite web is split along the interface in the direction of convergence of the converging planes, which direction is opposite to the direction of movement of the web.

---

The present invention relates to nonwoven fabrics and methods of making the same.

It has heretofore been proposed to make nonwoven fabrics by first forming a composite sheet of two or more fiber webs of the same or different fiber weight, bonding the individual fibers together to stabilize the composite of plied webs, and then splitting the composite sheet along an intermediate plane to obtain two stabilized fibrous sheets of essentially the same fiber weight as the original unstabilized webs which were plied together to form the composite sheet. This method has been suggested because it is generally easier and less costly to stabilize or otherwise treat the composite web of double or greater thickness than to treat the individual webs of single thickness. In addition, during drying, binder tends to concentrate at the outer surfaces of a through bonded web thus causing the surface to become hard. When using a split web technique, webs each having one soft surface can be produced, that soft surface being the surface previously lying along the intermediate plane of splitting.

Up to the present, when using such a split web technique, it has been necessary to apply the bonding agent to each side of the composite while taking care that the bonding agent does not completely penetrate the composite. As a result, little bonding agent is present at or near the interface between the two plied fibrous webs, and the composite sheet may be split along this weak intermediate plane. One of the difficulties involved is that the resulting nonuniform penetration of the bonding agents substantially affects the uniformity of the split product, the fibers on the one surface of each of the split webs previously lying adjacent to the unimpregnated center portion of the composite web being held together only loosely by fiber-to-fiber friction. As a result, there is often some dusting or fluffing of fibers from this surface of each of the split webs.

It is accordingly an object of the present invention to prepare nonwoven fibrous sheet materials by a split web technique in which the splitting of the binder impregnated web is essentially independent of the controlled penetration of the bonding agents used, and to thereby prepare split nonwoven fibrous sheets in which the number of loose fibers present on the one surface of each of the split webs previously lying adjacent the plane of splitting is substantially reduced.

According to the method of this invention, the individual fibrous webs which are to be plied together to form the splittable composite are formed so that the predominate orientation of the fibers adjacent at least one surface of the same is at an acute angle to that surface, that is, the majority of the surface fibers are sloping in generally the same direction with respect to the surface of the web. The webs are then subsequently plied together so that the angularly disposed fibers at the surfaces of at least a pair of the webs form an interface at which the fibers at one side of the interface and the fibers at the second side of the interface are predominately orientated at opposite acute angles to the interface. It has been found that after a composite web so formed is uniformly through bonded with a stabilizing agent, the same may be easily split along the interface between the plied webs in the direction toward a common vertex of the aforesaid acute angles to provide a plurality of fibrous sheets relatively uniformly bonded throughout and having minimal amounts of loose fibers on the surface of the same. In addition, the splitting operation may be highly controlled, the line of splitting varying only slightly from the interface; and thus highly uniform split webs may be obtained. Composite webs may, of course, also be prepared which are adapted to be split into more than two separate sheets by forming a composite of more than two webs and/or having more than one of the interfacial portions previously described.

The practice of the invention is not limited to any particular type, length, or denier of fiber and includes the use of waste fibers such as chopped threads and the like. Thus, any of the natural fibers such as cotton, linen, hemp, silk, wool, or wood pulp; or synthetic fibers such as rayon, acetate, polyester, acrylic or modacrylic fibers may be used. While as mentioned above, the method may be used with fibers of any length, it is of primary usefulness with webs made up mostly, i.e. 70% or more, of relatively short fibers, namely, those having a length of less than about ½ of an inch and especially those having a length of less than about ¼ of an inch, these short fibers formerly causing the greatest problems with respect to fiber fluffing-off from the split web and uniform splitting of the composite web. It has also been found that it is somewhat easier to form a composite web in which the surface fibers are uniformly disposed at an acute angle to the web surface when mostly short fibers are used.

The practice of the invention is also not limited to any particular type of binder solution, any of those known to persons skilled in the art being adequate. The type of binder and the amount of binder pick-up used depends upon the desired final characteristics of the split webs, including their drape, feel, scuff resistance, and the like.

As previously indicated, in practicing the present invention, it is important that in each of the individual fiber webs used, the fibers adjacent at least one surface have a predominate orientation at an acute angle to that surface and that a majority of the fibers slope in generally the same direction. Many of the individual surface fibers may slope in the direction opposite from the direction of predominate orientation and the individual fibers which do slope in the direction of predominate orientation may do so at various different acute angles to the surface.

This surface fiber orientation may be accomplished on any of the fiber laying machines of the type which lay fibers in a series of shingle like layers, each layer overlapping the edge of the layer immediately previously deposited. Each shingle like layer is thus disposed at a slight angle to the plane of the web and the individual fibers in each shingle are predominately oriented in the plane of the shingle.

An apparatus found to be particularly useful in laying web in this manner is that disclosed in U.S. Patent 2,703,441 to Langdon et al. and sold commercially as the Rando-Webber. However, any apparatus which lays fibers in such a manner may be used and the invention is not limited to the use of said Rando-Webber even though the use of this machine in the method of this invention is hereinafter particularly described and illustrated in the drawings.

The method of this invention will now be more specifically described by reference to the drawings in which, FIG. 1 illustrates a suitable method of forming the individual webs to be utilized in the method of this invention and further shows the web formed;

FIG. 3 is a diagramatic representation of the interfacial portion of a composite web of this invention prior to splitting, further showing the proper direction of splitting of the composite web;

FIG. 4 illustrates schematically a method of splitting the bonded composite sheet;

FIG. 5 illustrates a composite sheet which is designed to be split into more than two webs.

Figure 1:
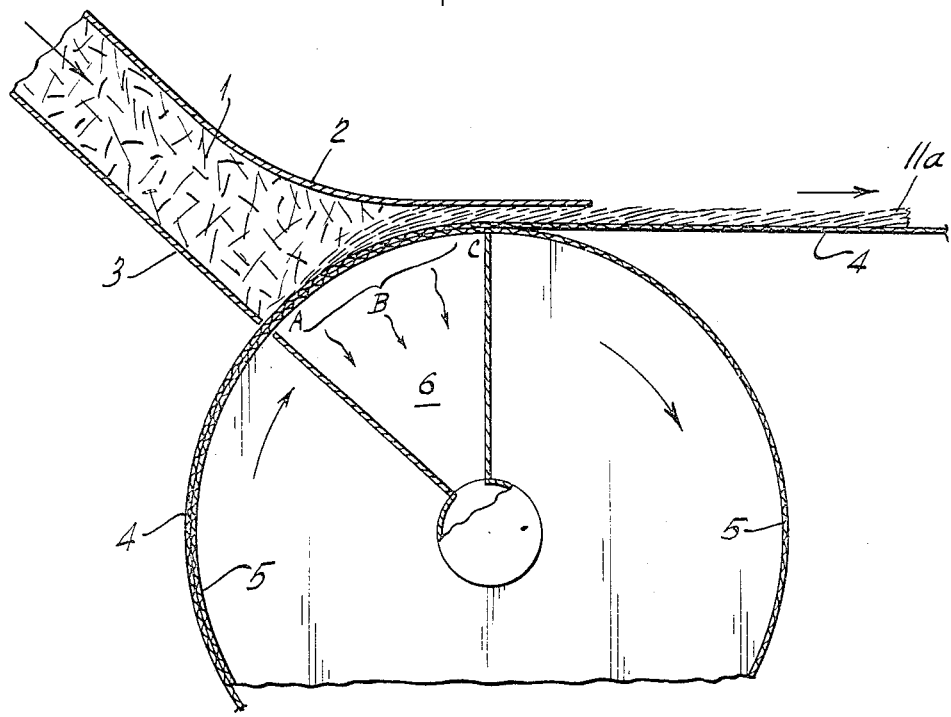

It is first suitable in practicing the method of this invention to form a plurality of fibrous webs in which the fibers adjacent at least one surface are predominately oriented at acute angles to that surface of the web, that is, a majority of the fibers slope generally in the same direction. One method of forming such a web is illustrated in FIG. 1. The individual fibers, 1, which are second cut cotton linters having a length of less than about ¼ of an inch, are carried by an air stream through a transverse duct delineated by an upper member, 2, and a lower member, 3. This air stream intersects a foraminous belt, 4, supported at this point by a foraminous cylinder, 5, which is rotating as indicated by the arrow. The air passes through the foraminous belt, 4, and the foraminous cylinder, 5, and exits from the system through the chamber 6. As illustrated, the fibers, 1, are being conveyed by the air stream at a rate of about 81 ounces per minute onto an approximately 1 yard wide foraminous belt which is moving at about 27 yards per minute. With this arrangement, a web, 11a, having a weight of about 3 ounces per square yard is formed.

As the cylinder, 5, rotates, the fibers are deposited initially on the belt, 4, at Zone A and then subsequently at Zone B on the bed of fibers that has been previously deposited. Because the fibers are being deposited simultaneously over both the essentially uncovered belt at A and over previously deposited fibers at B, the bed of deposited fibers at any instant is approximately triangular in cross-section with the apex of nearly zero thickness at A and the base of greatest thickness at C. As the web moves from left to right, further deposits of fibers are deposited as layers or shingles upon the hypotenuse of this triangle. As the continuous belt, 4, moves past the fiber depositing zone, the fibers are deposited in a plurality of these shingle like layers, the angle of the layer or layers depending to a degree on the thickness of the web being deposited. The result is a generally angular orientation of the individual fibers with respect to the surface of the belt 4. However, it should again be emphasized that not necessarily all of the fibers within a layer will slope in the same direction nor will all those that slope in the direction of predominate orientation necessarily slope at the same angle with respect to the plane of the web. The angles at which the fibers slope with respect to the web surface are generally rather small, on the order of less than 1°. However, angular displacements of from about .05° to 90° may be used, angles of from about 0.5° to about 35° being preferred.

Figure 2:
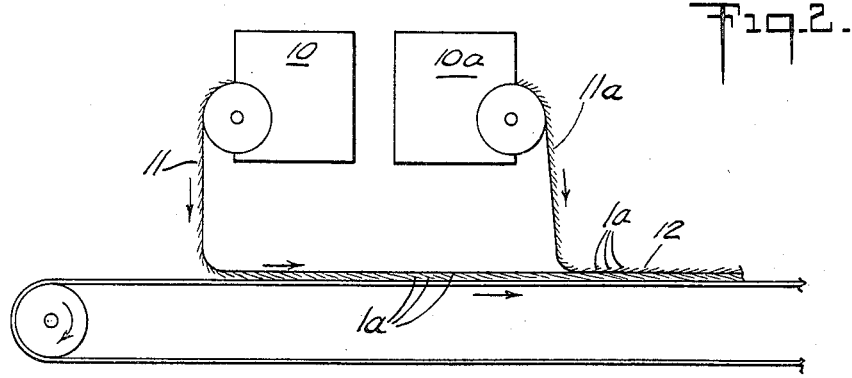
FIG. 2 illustrates schematically the proper plying together of the webs formed as shown in FIG. 1.

FIG. 2 illustrates the forming of the composite fibrous sheet. Two fibrous webs, 11 and 11a, are formed as described above on fiber laying machines, 10 and 10a, the individual fibers shown schematically as a series of the fiber planes, 1a, previously described disposed generally at an acute angle to the surface of each web. The two sheets are plied together to form composite, 12, in which the fibers at one side of the interface and the fibers at the second side of the interface are predominately disposed at opposite acute angles to the interface by reversing one web, 11, 180° about its longitudinal axis. In this case, the predominate orientation of the fibers in each of the webs, 11 and 11a, is at approximately the same, but opposite, acute angle with respect to the plane of the web; however, it is not necessary that the angle of predominate orientation of the two webs be equal.

The 3 ounce per square yard composite web, 12, is next impregnated with a 3% solids solution of an acrylate resin binder (Hycar 2671) in an aqueous carrier at a web pick-up weight of 4.5 ounces per square yard. The impregnated web is then dried in a hot air dryer and cured at 310° F. for three minutes.

An interfacial portion of the completed binder stabilized composite 12 is illustrated diagrammatically in FIG. 3. The angle of the shingles 1a of fibers, i.e., essentially the predominate orientation of the individual fibers, with respect to the interface 13 between the webs 11 and 11a is exaggerated for purposes of clarity. The predominate orientation of the fibers at the interfacial surface of the fibrous-web 11 and the predominate orientation of the fibers at the interfacial surface of the fibrous web 11a are at opposite acute angles with respect to the plane 13 of the interface between the webs 11 and 11a. The planes 14 and 15 defined by the angle of orientation of the fiber shingles slope in opposite directions and intersect to form a vertex at the interface 13.

By virtue of the angular orientation of the fibers, a cleavage plane is formed between the webs 11 and 11a at the interfacial plane 13 along which the composite can be readily split in the direction of the common vertex of planes 14 and 15. However, the individual webs 11 and 11a will also split along the series of cleavage planes 14 and 15 between the fiber shingles 1a if splitting is not attempted in the correct direction. Accordingly, in order to split the composite along the interface 13, the same must be split in the direction of the vertex formed by planes 14 and 15, or in other words, from the left side of the composite sheet as shown in the drawing. If it is attempted to split the sheet in the opposite direction, the web will tend to split along the planes 14 and 15, defined by the angle of fiber shingle orientation as shown on the right side of the drawing in FIG. 3.

The splitting of the web 12 can be readily accomplished as illustrated in FIG. 4 by passing the same between two rolls 20 and 21, the web being split by drawing sheet 11 around one of the rolls and sheet 11a around the other roll as the web passes from the nip between the rolls, the splitting being aided by a wedge-shaped member 22 positioned near the exit side of the nip between the rolls 20 and 21. After initiating the split, the sheets 11 and 11a resulting from splitting the web 12 are drawn respectively around the rolls 21 and 20.

As previously stated, more than two sheets may be made simultaneously while practicing the process of this invention by forming the composite so that there is more than one interface of the type described between angularly disposed fibers. Such a composite is illustrated in FIG. 5 of the drawing where there is shown a cross section of a composite web 30 consisting of fiber webs 11, 11a, and 11b formed substantially as described and illustrated in FIG. 1 and plied together as shown in FIG. 2 so that the fibers at each of the two interfaces formed by the three webs are predominately disposed at opposite acute angles to the interface 13 and 13a. After the web is bonded, it may be split using the same means illustrated in FIG. 4 by first splitting web 11a from the remainder of the composite web 30 and then splitting remaining webs 11a and 11b from each other.

Although several specific embodiments of the invention have been described, they have only been included to illustrate the same, the invention only being limited by the appended claims.

What is claimed is:

1. The method of making nonwoven fabrics comprising continuously forming a composite web having at least one interface having a first side and a second side, the individual fibers adjacent the first side of said interface being predominately oriented at an acute angle with respect to the interface and defining a first series of fiber planes; the individual fibers adjacent the second side of said interface being predominately oriented at an acute angle with respect to the interface which is opposite the angle of predominate orientation of the fibers at said first side of the interface and defining a second series of fiber planes, said first series of fiber planes converging with said second series of fiber planes in a direction opposite to the direction of motion of said continuously formed web;

interbonding the fibers of said composite web together with a bonding agent;

and then splitting said continuously moving composite web along the interface in the direction of convergence of said converging planes.

2. The method of claim 1 wherein most of said fibers have a length of no greater than about ½ of an inch.

3. The method of claim 2 in which most of said fibers have a length which is no greater than about ¼ of an inch.

4. The method of claim 3 in which the acute angle of predominate fiber orientation of the fibers adjacent one side of said interface and the opposite acute angle of predominate orientation of the fibers adjacent the second side of said interface are essentially equal.

5. The method of claim 1 wherein said composite web has a plurality of interfaces each having a first side and a second side wherein the fibers adjacent the first side of the interface and the fibers adjacent the second side of the interface are predominately oriented at opposite acute angles with respect to the interface.

6. The method of claim 1 wherein said angle of predominate orientation of the fibers adjacent the first side of the interface and the angle of predominate orientation of the fibers adjacent the second side of said interface is between about 0.5° and about 35°.

7. The method of claim 6 in which the angles of predominate fiber orientation are between about 0.5° and about 1.0°.

References Cited

UNITED STATES PATENTS

| 1,739,322 | 12/1929 | Moore | 156—254 |
|---|---|---|---|
| 1,864,626 | 6/1932 | Arentsen | 264—112 |
| 2,288,095 | 6/1942 | Lindsay et al. | 264—121 |
| 2,331,145 | 10/1943 | Slayter | 156—62.8 |
| 2,897,874 | 8/1959 | Stalego et al. | 156—62.8 |

FOREIGN PATENTS

| 934,445 | 5/1948 | France. |
|---|---|---|

HAROLD ANSHER, Primary Examiner
W. E. HOAG, Assistant Examiner

U.S. Cl. X.R.

156—254; 264—91, 146